(12) United States Patent
Dutta et al.

(10) Patent No.: US 8,954,925 B2
(45) Date of Patent: Feb. 10, 2015

(54) USER AUGMENTED REVERSE ENGINEERING

(75) Inventors: Suhail Dutta, Seattle, WA (US); Tracey Trewin, Fall City, WA (US); Andrew Byrne, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 663 days.

(21) Appl. No.: 12/819,113

(22) Filed: Jun. 18, 2010

(65) Prior Publication Data

US 2011/0314445 A1 Dec. 22, 2011

(51) Int. Cl.
*G06F 9/44* (2006.01)
(52) U.S. Cl.
CPC ...... *G06F 8/75* (2013.01); *G06F 8/74* (2013.01)
USPC ............................ 717/109; 717/105; 717/113
(58) Field of Classification Search
CPC .......................................................... G06F 8/34
USPC ........... 717/106–113, 136–167; 715/762–788
See application file for complete search history.

(56) References Cited

U.S. PATENT DOCUMENTS

| | | | |
|---|---|---|---|
| 6,346,945 B1 | 2/2002 | Mansurov et al. | |
| 6,425,121 B1 * | 7/2002 | Phillips ........................ | 717/109 |
| 7,020,697 B1 | 3/2006 | Goodman et al. | |
| 7,546,577 B2 * | 6/2009 | Do et al. ....................... | 717/108 |
| 2002/0104071 A1 | 8/2002 | Charisius et al. | |
| 2003/0172369 A1 * | 9/2003 | Kodosky et al. .............. | 717/113 |
| 2005/0177816 A1 * | 8/2005 | Kudukoli et al. ............. | 717/105 |
| 2006/0059011 A1 * | 3/2006 | Ulreich et al. ..................... | 705/1 |
| 2007/0055972 A1 | 3/2007 | Brown et al. | |
| 2007/0132779 A1 * | 6/2007 | Gilbert et al. ................. | 345/619 |
| 2007/0157138 A1 * | 7/2007 | Ciolfi et al. ........................ | 716/4 |
| 2008/0022264 A1 * | 1/2008 | Macklem et al. ............. | 717/136 |
| 2008/0196006 A1 * | 8/2008 | Bates et al. ................... | 717/109 |
| 2009/0037884 A1 | 2/2009 | Benameur et al. | |
| 2009/0254891 A1 | 10/2009 | Cui et al. | |
| 2010/0064275 A1 | 3/2010 | Akkiraju et al. | |
| 2010/0100868 A1 * | 4/2010 | Shukla et al. ................. | 717/109 |

OTHER PUBLICATIONS

R Tilleyz, K Wong, Programmable Reverse Engineering, MAD Storey—1994, pp. 1-34.*

(Continued)

*Primary Examiner* — Satish Rampuria
(74) *Attorney, Agent, or Firm* — Kevin Sullivan; Kate Drakos; Micky Minhas

(57) ABSTRACT

Disclosed herein is user augmented reverse engineering, where, in one embodiment, during the generation of a graphical representation of a codebase, database, binary and the like, users may be provided with an option to 'focus'. For example, during the graphical generation of a large codebase, a user may select one or things to limit the extent of the graphical representation generation. In another embodiment, a graphical generation may encounter one or more pre-defined boundary conditions. Upon encountering a boundary condition, the generation of the graphical representation may determine that it is unable to complete the graphical generation within a pre-defined set of requirements without additional instructions. Thus, the graphical generation may complete and then prompt a user for solutions to any boundary conditions it has encountered, or the generation may pause at each boundary condition it encounters and prompt a user for a solution to the boundary condition.

15 Claims, 9 Drawing Sheets

(56) References Cited

OTHER PUBLICATIONS

Cross, Reverse Engineering Control Structure Diagrams, IEEE, 1993, pp. 107-116.*

Costagliola, G., Tortora, G., Orefice, S., de Lucia, A., Automatic generation of visual programming environments, Computer, 1995, vol. 28, No. 3, pp. 56-66.*

Lanza et al., Polymetric Views—A Lightweight Visual Approach to Reverse Engineering, IEEE Transactions on Software Engineering, vol. 29, No. 9, Sep. 2003, pp. 782-795.*

Maletic et al., A Task Oriented View of Software Visualization, Proceedings of the First International Workshop on Visualizing Software for Understanding and Analysis (VISSOFT.02), IEEE, 2002, pp. 1-9.*

Cherubini et al., Let's Go to the Whiteboard: How and Why Software Developers Use Drawings, CHI 2007 Proceedings • Programming by Professionals Apr. 28-May 3, 2007, ACM, San Jose, CA, USA, pp. 557-566.*

International Patent Application No. PCT/US2011/039320: International Search Report and Written Opinion dated Jan. 2, 2012, 11 pages.

Conti et al., "Visual Reverse Engineering of Binary and Data Files", Proceedings of the 5th international workshop on Visualization for Computer Security, Cambridge, MA, USA, Sep. 15, 2008, 1-18.

Raza et al., "Bauhaus—A Tool Suite for Program Analysis and Reverse Engineering", 11$^{th}$ International Conference on Reliable Software Technologies, Ada Europe, Porto, Portugal, Jun. 5-9, 2006, 12 pages.

Rountev et al., "Static Control-Flow Analysis for Reverse Engineering of UML Sequence Diagrams", PASTE 2005, Proc. of the 6th Workshop on Program Analysis for Software Tools and Engineering, Lisbon, Portugal, Sep. 5 and 6, 2005, 7 pages.

Stroulia et al., "Dynamic Analysis for Reverse Engineering and Program Understanding", ACM SIGAPP Applied Computing Review, Spring 2002, 10(1), 8-17.

Weijun et al., "An Approach for Reverse Engineering of Web Applications", International Symposium on Information Science and Engineering, Dec. 20-22, 2008, 98-102.

European Patent Application No. 11796188.8; Supplementary Search Report; dated Feb. 12, 2014; 8 pages.

Walkinshaw et al.; "Reverse Engineering State Machines by Interactive Grammar Inference"; Reverse Engineering; 14$^{th}$ Working Conf. IEEE; Oct. 2007; pp. 209-218.

* cited by examiner

USER AUGMENTED REVERSE ENGINEERING

TECHNICAL FIELD

The following relates generally to the fields of codebase, binaries, and database reverse engineering and visual representations of codebases, binaries, and databases.

BACKGROUND

It is commonly stated that a picture is worth a thousand words. This saying may be particularly true for individuals who seek to work on pre-existing codebases or to otherwise create a visual representation of a codebase binaries, or reverse engineering database. With advances in functionality of computer hardware and software, codebases have become increasingly large and complicated. Often, a number of different programmers will work with a single codebase or project. These individuals may not be familiar with all of the elements of a codebase and thus may need a general 'map' of a codebase, or they may need information about specific structures within the codebase. To help individuals with this problem, programs have been developed which provide graphical representations of codebases in the form of flow charts, run charts, timing charts, trees, and the like.

These programs, which provide graphical representations of codebases can generally be divided into two groups: static analysis charting programs and run time analysis charting programs. Static analysis programs are far more common but they are limited in a number of ways. Codebases undergoing static analysis may have a number of "boundaries" which the static analysis in unable to resolve. Further, static analysis lack the ability to determine the actual function of a codebase, and they may not be capable of locating bugs and the like. In addition, static codebases may not be able to focus on both an overview of a codebase as well as a specific class, function, call, algorithm, element, value, parameters, sequences, components, activities or the like.

Similarly, run time representations have a series of problems. If a system has bugs or errors such that a run cannot complete, the run time representation may fail. Further, the run may only follow a specific course of action and may not provide a full representation. Other problems may be associated with either or both of static and dynamic representations.

Thus, systems and methods are needed to overcome problems in both static and run time codebase diagrams.

SUMMARY

In an embodiment, in order to overcome the limitations associated with both static and run time graphical representations of codebases, database schemas, binary databases and the like, users may be provided with an option to 'focus' the generation of a graphical representation during the processing of a codebase, database schema, binary database and the like. For example, during the graphical generation of a large codebase, a user may select one or more classes, terms, algorithms, values, terms, protocols, sequences, components, activities, use cases, processes or the like to limit the extent of the graphical representation generation. As one example, during the generation of the graphical representation of the codebase, a user may pause the graphical generation, provide an input removing or selecting one or more elements of the graphical generation which may limit the remainder of the generation to only those sub-elements related to the desired elements.

In another embodiment, a graphical generation may encounter one or more pre-defined boundary conditions. Upon encountering a boundary condition, the generation of the graphical representation may determine that it is unable to complete the graphical generation within a pre-defined set of requirements without additional instructions. Thus, the generation may continue without fulfilling the boundary condition until the generation has created a representation of every element that it can, or the generation may pause upon encountering the boundary condition and request a user input before continuing the remainder of the generation.

Boundary conditions may be defined in a variety of ways. In one embodiment, a lack of memory may be a boundary condition. In another embodiment, a determination that the generation will take over a certain amount of time is a boundary condition. In a further embodiment, a determination that one or more portions of the code require input from an external database or source may be a boundary condition. In another embodiment, when there are multiple portions of the codebase, database schema, binary database and the like that may provide a solution to a function, process, call or the like, the system may prompt a user with the possible solutions and the user may then select the desired solution. In addition, a user may provide an instruction to the reverse engineering such that the generation will consider a specific limitation as a boundary condition. In other words, boundary conditions may also be user defined. One having skill in the art will recognize that the above is not an exhaustive list of boundary conditions but merely provides a few example in order to generally describe user augmented reverse engineering.

In another embodiment, user augmented reverse engineering can include both the possibility of receiving an input from a user real-time during the generation of a graphical representation and may also comprise the ability to detect one or more pre-defined boundary conditions and to provide a user with an interface for the input of information related to the boundary condition. Thus, a user may, during the generation of the graphical representation, provide input to the system to complete generations that previously were not possible, and the user may also direct a graphical generation during the generation itself, thus focusing on the portions of the codebase, database schema, binary database and the like that are relevant to the user.

In another embodiment, either of the above described embodiments may be provided during a static generation of a code base and the like, and/or during a run-time generation of a code base and the like. During either type of generation, it is envisioned that user interfaces for the input of information may be provided in order to allow a user to focus a codebase, database schema, binary database and the like or to allow a user to satisfy a request for a solution to a pre-determined boundary condition.

BRIEF DESCRIPTION OF THE DRAWINGS

FIG. 6 depicts a flow chart representing an example method for overcoming a boundary condition in a graphical generation of a codebase, database schema, binary database and the like.

FIG. 7 depicts a flow chart representing one embodiment of a method for employing an active environment to direct the generation of a graphical representation of a codebase, database schema, binary database and the like.

DETAILED DESCRIPTION OF ILLUSTRATIVE EMBODIMENTS

Although "codebase" is generally referenced hereafter in the specification without including all other options, it should be understood that the embodiments disclosed herein include any other type of codebase, instructions implemented on a computer readable medium, database schema, binary schema, database, code database, code and the like.

In one embodiment, user augmented reverse engineering comprises a computer-implemented, interactive method for creating a graphical representation of a codebase, database schema, binary database and the like. The method includes generating a graphical representation of a first portion of the codebase database schema, binary database and the like; determining that a pre-defined boundary condition exists; prompting a user for input relating to the boundary condition; receiving user input concerning the boundary condition; and generating a graphical representation of a second portion of said codebase, database schema, binary database and the like.

In another embodiment, user augment reverse engineering comprises a computer-implemented, interactive method for creating a graphical representation of a codebase. The method includes reviewing a first portion of a codebase; generating the graphical representation of the first portion of the codebase; displaying the graphical representation of the first portion of the codebase on a display; receiving an input during the generation of the first portion of the graphical representation, wherein the input comprises an interruption of said generation of the graphical representation; and resuming the generation of the graphical representation, wherein said resumed generation excludes a second portion of the codebase from the graphical representation.

In another embodiment, user augmented reverse engineering comprises a computer readable storage medium having stored thereon, instructions for executing on a processor. The instructions include instructions for reviewing a first portion of a codebase, generating a graphical representation of the first portion of the codebase, receiving an input wherein the input alters the scope of the graphical representation, reviewing a second portion of the codebase generating a graphical representation of the second portion of the codebase, and displaying the graphical representation of the codebase.

Figure 1:
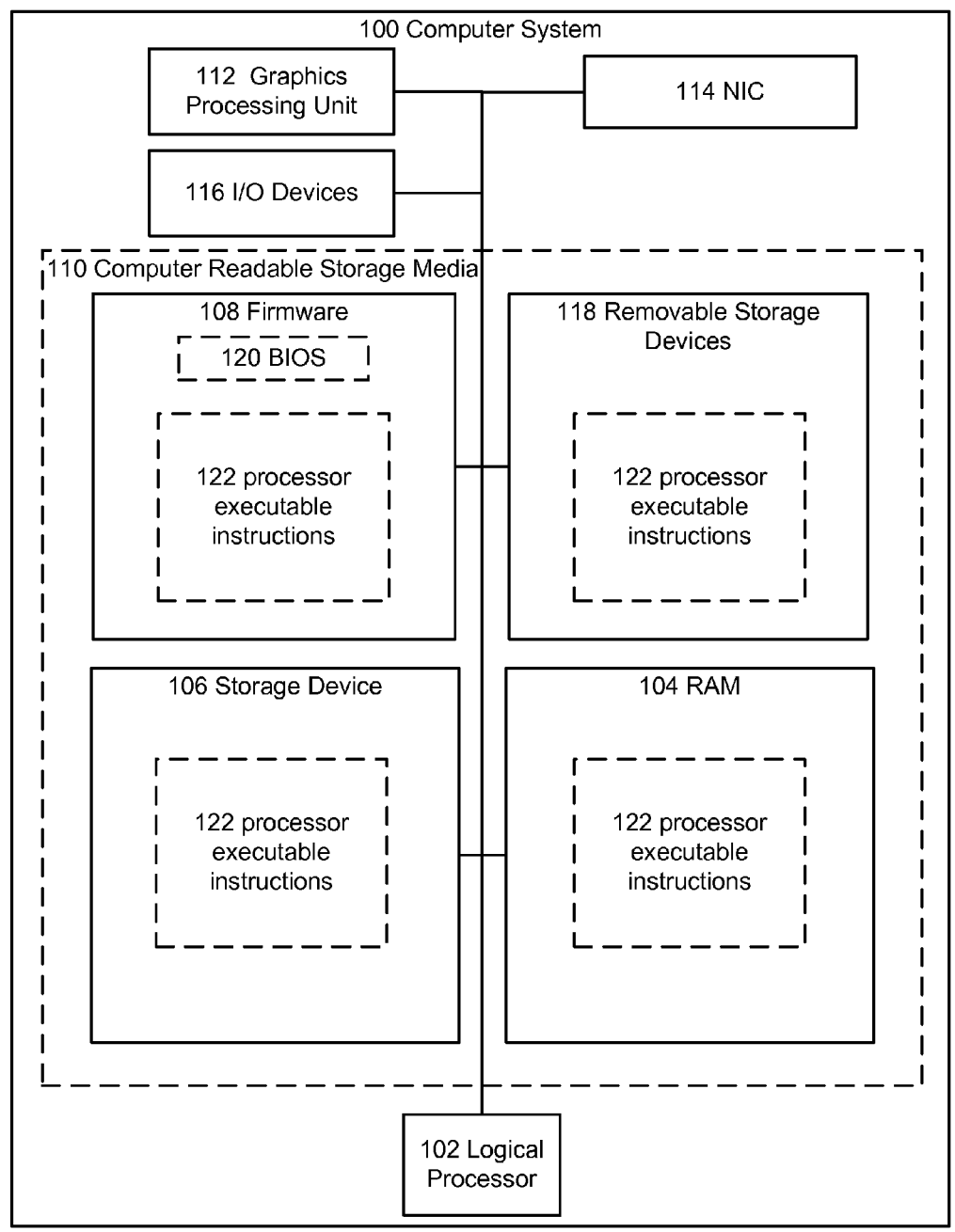
FIG. 1 depicts an example computer system wherein the disclosed subject matter can be implemented.

Embodiments of user augmented reverse engineering may execute on one or more computer systems. FIG. 1 and the following discussion are intended to provide a brief general description of a suitable computing environment in which the disclosed subject matter can be implemented.

The term circuitry used throughout the description can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software, an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by FIG. 1, various computer readable storage media 110 can be interconnected by one or more system busses that couples various system components to the logical processor 102. The system busses may be any of several types of bus structures including a memory bus or memory controller, a peripheral bus, and a local bus using any of a variety of bus architectures. In example embodiments, the computer readable storage media 110 can include, for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer readable storage media 110 can provide non volatile and volatile storage of processor executable instructions 122, data structures, program modules, and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 that can include, but are not limited to, a keyboard, and pointing device. Other input devices may include a microphone, joystick, game pad, scanner, or the like. These and other input devices are often connected to logical processor 102 through a serial port interface that is coupled to the system bus, but may be connected by other interfaces, such as a parallel port, game port, or universal serial bus (USB). A display or other type of display device can also be connected to the system bus via an interface, such as a video adapter, that can be part of or connected to a graphics processor unit 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers. The remote computer may be another computer, a server, a router, a network PC, a peer device, or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the disclosed subject matter can be implemented are particularly well-suited for computerized systems, nothing in this document is intended to limit the disclosed subject matter can be implemented to such embodiments.

Figure 2:
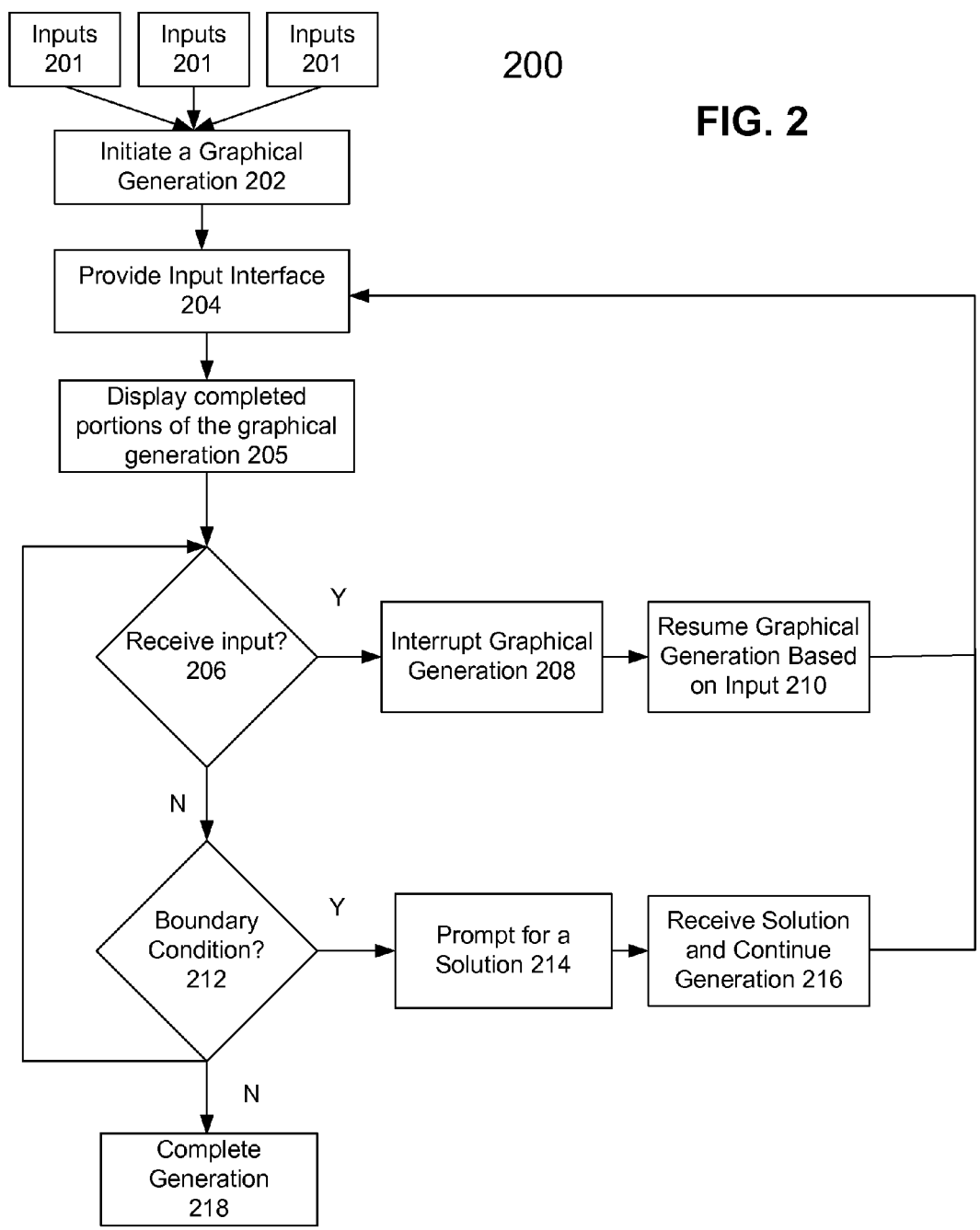
FIG. 2 depicts a flowchart for operation of various aspects of user augmented reverse engineering.

FIG. 2 depicts one possibility for a logical flowchart 200 depicting the implementation of user augmented reverse engineering. FIG. 2 depicts the initiation of a graphical generation at 202 based on inputs 201. The graphical generation initiated at 202 comprises any visual representation of a codebase known in the art. Thus, in one embodiment a graphical generation can be, for example, one or more of a flowchart, a run diagram, timing charts, timing diagrams, a tree chart or diagram, graphs, pictures, or any other manner of representing a codebase or the functionality of a codebase.

The structure of the graphical generation initiated 202 may also be any structure known in the art. The graphical generation may, for example, track one or more specific aspects of a codebase. A graphical representation, which may be any graphical representation noted above may be chart a particular process, value, element, class, sequence, component, time frame, activity, use case, parameter, functionality, sub-process, element, input, output, term, algorithm, and the like, and it may represent the timing of inputs, outputs, processes, sequences, elements, values, parameters, functionalities, sub-processes, term and the like, and may also be structured based on, memory, internal relationships, external relationships or in any other manner known in the art.

In an embodiment, prior to initiating the graphical generation at 202, one or more inputs 201 may be provided to direct one or more aspects of a user implemented reverse engineering program. For example, one or more inputs may be used to focus the generation of a graphical representation on a specific element before the generation initiates. An input 201 may be any value that may narrow, direct, focus or otherwise alter the generation of the graphical representation. As another example, an input 201 to user augmented reverse engineering may be the selection of the type of graphical representation the user desires, such as, for example, a timing chart or a flow chart. In addition, an input 201 may be define the structure of the graphical generation.

In one embodiment, a user may provide one or more inputs 201 to establish boundary conditions of the graphical generation. For example, one or more boundary conditions may be pre-determined. In such an embodiment, an input to a graphical generation may cause user augmented reverse engineering to add a boundary condition. As another example, an input 201 could be used or alter a previously set boundary condition. As one non-limiting specific example, a user may select the amount of time allotted to a graphical generation before the system will determine that there it has reached a boundary condition. In such an example, a user could designate a 5 minute time limit, wherein, when it is determined that the graphical generation may take more than the time allotted in the boundary condition, user augmented reverse engineering provides an interface to a user which allows them to direct the generation of the graphical representation in one or more ways.

Regardless of the structure of the graphical generation, the type of graphical representation, the pre-selected boundary condition and any other initial inputs 201, in one embodiment, the graphical generation initiates 202. Upon initiation 202, the graphical generation may comprise a user interface 204.

A user interface 204 allows for the input of information to the graphical generation. The user may enter input to the graphical generation during the generation and/or after the generation completes. The user interface 204 may be implemented by any means of receiving input from a user, program or system known in the art. For example, the user interface may allow for input of information via one or more of a mouse click, a keyboard, a joystick, by voice activation, a touchpad or a touch screen, a wired or wireless connection or any other means known by one having skill in the art.

During the generation of the graphical representation, completed portions of the generation may be displayed on a display 205. For example, each time the user augmented reverse engineering program determines the next step in, for example, a flowchart, that step may be displayed 205 on an output device. The output device may be any device known in the art for displaying visual information to a user. In one embodiment, the output is displayed on a screen or projected such that the graphical generation may be seen.

The portions of the graphical generation that are being displayed 205 may be associated with the user interface 204. For example, in one embodiment, for each element displayed in a graphical representation, inputs may be associated with the element. For example, if a flow chart is being built and 5 steps in the flow chart have been displayed, a user may mouse over to any one of the five steps and click, thus providing an input associated with the selected graphical element of the flow chart. This selection of a particular element may provide the totality of the input from a user on that particular element or it may act to constrain possible inputs by the user.

As another non-limiting example of a user interface 204, a single user interface 204 may be provided regardless of the number of elements displayed in a graphical representation. For example, there may be an option for a user to pause a graphical generation at any time. After the pausing, additional user inputs may be provided to guide, focus, or otherwise provide input to the graphical generation.

Thus, as user augmented reverse engineering 200 is running, it may be configured to receive any of the above described inputs at 206. If no input is received at 206, the generation process may continue. If an input is received at 206, however, the input may have associated therewith, an interruption of graphical generation 208. As another example, the input could be configured to interrupt the graphical generation 208. Interruption of graphical generation 208 may be an interruption that causes the system to pause reviewing the codebase and may also stop it from adding graphical elements to the graphical display. Although the graphical generation may be interrupted at 208, user augmented reverse engineering may retain the information associated with the graphical generation prior to the point of interruption.

Upon interruption of the graphical generation 208, user augmented reverse engineering may request additional input from a user, or, the input provided from the user interface 204 may be sufficient to initiate a resumed graphical generation 210. For example, the input received at 206 may solely comprise an interruption 208. In such an example, the user may be prompted to provide additional input to direct the generation.

In another embodiment, however, the interruption input may also be configured to direct the resumed generation of the graphical representation at 210. For example, if the user selects a single element of a flow chart by clicking on it, the system may interrupt the original generation of the graphical representation, and then resume the graphical generation, where the resumed generation focuses on the clicked on aspect of the flow chart.

Thus, after user input sufficient to resume the graphical generation is received, the user may be provided with the option of resuming the graphical generation at 210, or, as another example, the graphical generation may resume at 210 automatically. In either case, the generation can resume and the user will again be provided with an user interface as described above in case the user desires to include additional input.

At any time during the generation of a graphical representation, user augmented reverse engineering may encounter a pre-determined boundary condition at 212. A pre determined boundary condition can be, in one embodiment, any circumstance where the generation can not finish the graphical representation. For example, if the codebase undergoing a graphical generation requires an external input that is not available to the codebase, a graphical generation may determine that there is a boundary condition 212. As another example, if, within the codebase, there are a number of probable solutions to a call, question, algorithm or the like, the system may determine that there is a boundary condition 212. Any other limitation preventing the graphical representation from completing will be known by one having skill in the art and those limitations are included herein.

In an additional embodiment, boundary conditions may be predetermined based on other factors such as the amount of time or memory or space on a display that it may take to provide a graphical representation. For example, if the amount of time to complete a portion of a generation, (including but not limited to the entirety), is over a pre-determined amount, user augmented reverse engineering may determine that there is a boundary condition 212.

Upon determining that there is a boundary condition 212, a user may be prompted for a solution 214. As one example, a interface may open, pop up, become active or the like, which may require a user to input information before the generation will resume.

As one example of prompting for a solution 214, a graphical generation may be running and user augmented reverse engineering 200 may determine that there are limited number of available solutions to a call, element, process, algorithm or the like in the codebase. As a first example, the user may be provided with a plurality of the probable solutions and asked to select which is the appropriate solution. In such an example, the input of the user is limited to only those solutions which 'make sense' within the context of the codebase.

In another embodiment of prompting for a solution 214, the inputs from a user may be limited in one or more ways. For example, the type of entry may be limited to numerical solutions only, or solutions having associated therewith, a string, a function, a process, an element, a value or the like. In general, the prompt to the user may be limited in any way that may decrease the likelihood of an improper input from the user.

In an additional embodiment of prompting for a solution, 214, there may be no limitations placed on the potential input at all. In such an example, the user may provide any response available to them.

After the prompting for the solution at 214 and the input by a user, the input is received at 216. If it is possible, the generation of the graphical representation will continue 216. As an example, if the solution at 214 is sufficient to continue the generation at 216, then the generation will continue before with an user interface provided and will continue until an user input is received or another boundary condition is encountered at 212, or if there is no additional user input or boundary condition encountered, the generation will complete at 218. The receipt of a solution at 216 may influence the generation going forward in any manner known in the art.

It should be noted that FIG. 2 depicts one example of user augmented reverse engineering. In another embodiment, an user interface at 204 may not be provided and the generation will continue unless a boundary condition is encountered. In another embodiment, a generation will not pause at predetermined boundary conditions, and will only include the user user interface 204 which can interrupt and influence the generation. The addition of other, or removal or reordering of the depicted elements of FIG. 2 are considered to be within the scope of user augmented reverse engineering and other arrangements of the elements of FIG. 2 will be understood by one having skill in the art.

Figure 3:
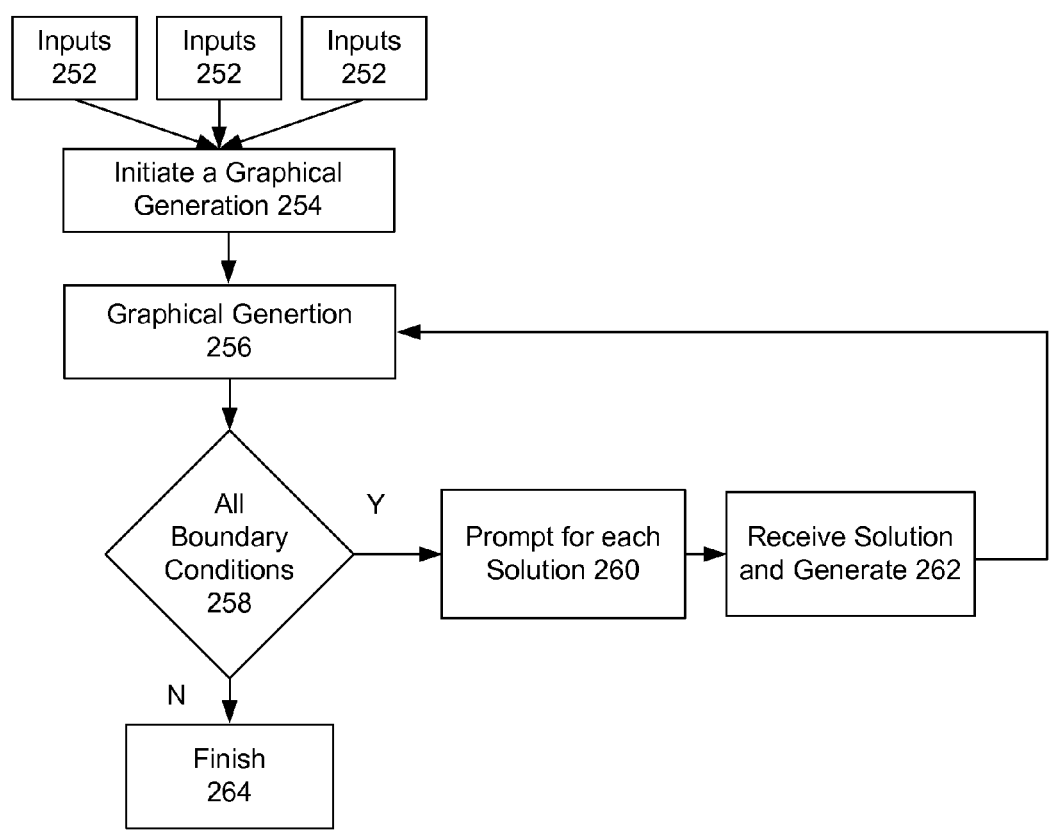
FIG. 3 depicts a flowchart for operation of various aspects of a boundary condition in user augmented reverse engineering.

FIG. 3 depicts another embodiment of user augmented reverse engineering having logic different from that described above with respect to FIG. 2. For example, in one embodiment, a graphical generation may be initiated at 254 with inputs 252. As noted above, the inputs 252 may limit the scope of the generation and the like, they may determine the type of graphical output and they may define boundary condition for the system. Any other inputs for user augmented reverse engineering may be included in inputs 252.

After receiving inputs 252 and initiating the graphical generation at 254, the system may then perform a graphical generation 256. During the graphical generation at 256, one or two, or ten or any other number of boundary conditions may be reached. In one embodiment, the graphical generation may not pause each time it is determined that there is a boundary condition. Rather, the graphical generation may pause only after the generation has satisfied the requirements of the inputs, or has otherwise performed as much of the graphical generation on a first portion of the code as possible. In one embodiment, performing as much of the generation as possible without having users input respond to boundary conditions may reduce the likelihood that a user would input improper information.

After the graphical generation 256, user augmented reverse engineering may provide a graphical representation showing the generation and one or more instances of boundary conditions 258 in the codebase. In one embodiment, each boundary condition 258 may be identified by any means known in the art on a display. Upon identification of boundary conditions 258, the user may be prompted to examine the boundary conditions 260. In one embodiment, each an interface may provide access to each boundary condition and allow for inputs by a user. The inputs by the user may be limited in any of the ways noted above with respect to FIG. 2. The user may choose to satisfy every boundary condition outstanding in a graphical generation or they may selectively provide solutions to the boundary conditions. Thus, the user may selectively provide inputs for any number of the boundary conditions.

As the user inputs solutions to the boundary conditions in response to a prompt at 260, user augmented reverse engineering may receive the solutions at 262. After receiving all solutions, or based on input from the user, user augmented reverse engineering may perform a graphical generation of the codebase on the portions having solutions to the boundary conditions. In the generation 262, new boundary conditions may be discovered. The user may be prompted again at 260 to fulfill those boundary conditions. In other words, the process may continue until there are no more boundary conditions, or until the user has provided input for all boundary conditions that he wishes to, at which point the graphical generation will be finished 264.

Figure 4:
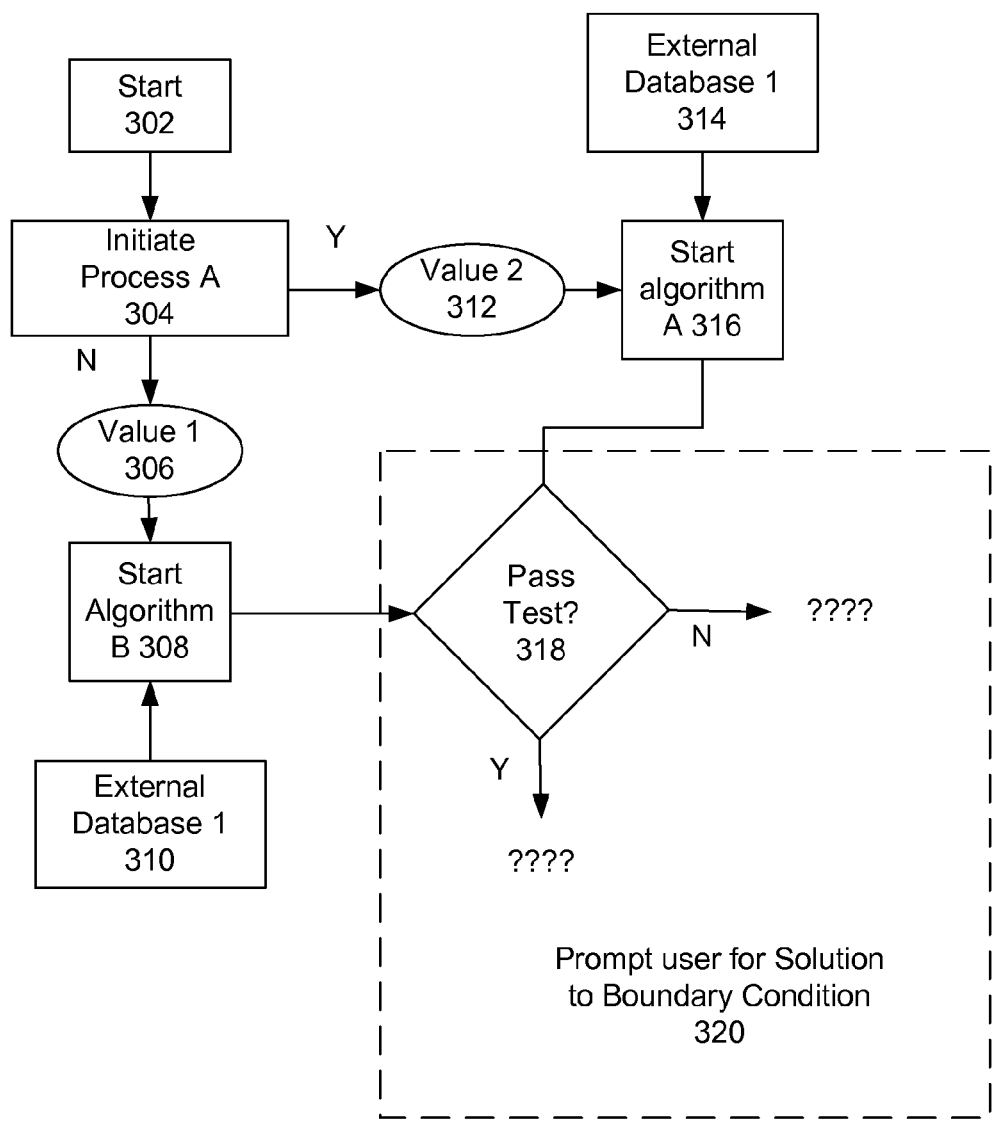
FIG. 4 depicts a sample graphical representation of a codebase, database schema, binary database and the like where the codebase, database schema, binary database and the like has a boundary condition.

FIG. 4 depicts an example of a boundary condition where the system is unable to determine a solution to a call in a code base. In FIG. 4, a graphical generation 300 of a process is taking place, and the flowchart of FIG. 4 may be, for example, a graphical representation 300 of the process of a codebase. The generation may determine that there is a start point 302 of the process. From the start point 302, the generation may next determine that process 300 has associated therewith, process A at 304. Process A may output Value 1 at 306 and Value 2 at 312 based on a 'yes' or 'no' solution to Process A at 304. Value 1 at 306 and Value 2 at 312 may be utilized by Algorithm B at 308 and Algorithm A at 316. However, at this point, the generation may determine that it needs a value from external database 1 at 310. If information from external database 1 at 310 is not available to the generation, the generation may determine that it is unable to complete graphical representation 300. In such an even, user augmented reverse engineering may prompt a user for an input at 320 in order to complete the graphical generation.

FIG. 4 depicts an embodiment where a graphical generation of cannot complete because information contained in external database 1 at 310 is not available to the user augmented reverse engineering. As noted above, this is just one boundary condition and the figure is not intended to limit the various types of boundary conditions that may occur. As noted above, a user, programmer or the like may select any condition and pre-determine that the selected condition has associated therewith, a boundary condition. Further, it will be recognized by one having skill in the art that user augmented reverse engineering may be configured to incorporate any condition such as time, memory, missing elements, a group of probable elements and the like, as a pre-determined boundary condition.

Figure 5A:
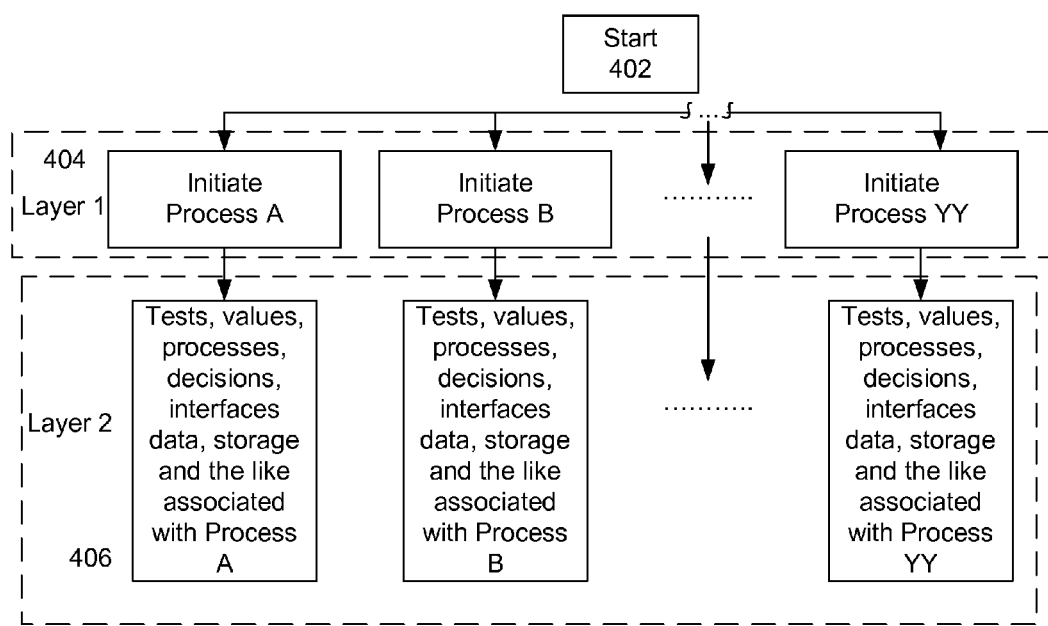
FIGS. 5 (a)-(b) depict a sample graphical representation of a codebase, database schema, binary database and the like where a portion of the codebase, database schema, binary database and the like has been excluded from the graphical generation.
Figure 5B:
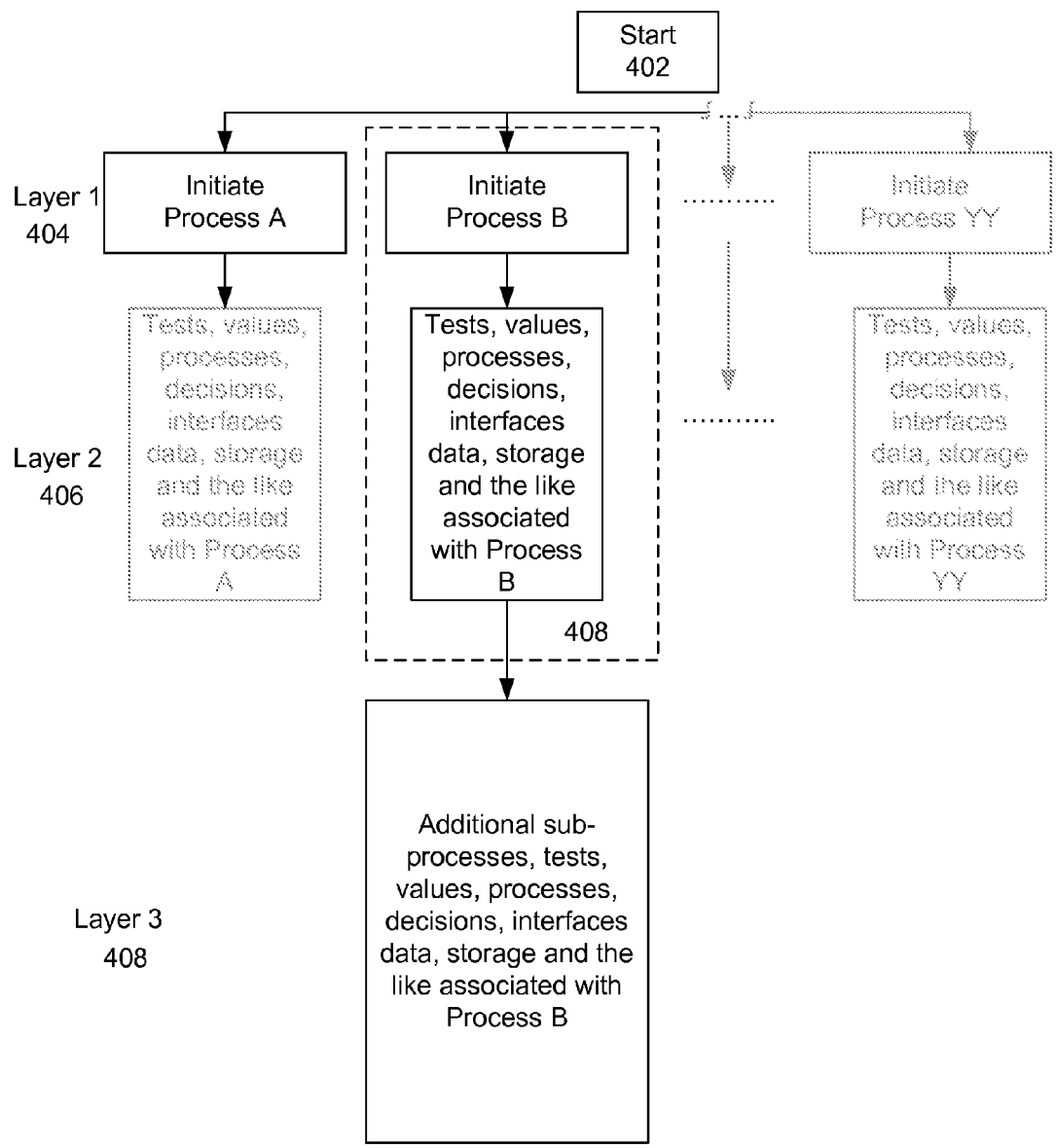

FIGS. 5(a)-FIG. 5(b) depict an example embodiment of focusing the result of a graphical generation based on input from a user. FIGS. 5(a)-(b), represent a display of a graphical generation that is in process, where the graphical generation includes a starting point 402. As noted above with respect to FIG. 2, when a graphical generation start 202, an interface for input may be provided. Although not depicted in FIGS. 5(a)-5(b), as the chart in FIGS. 5(a)-5(b) are being created, it is to be understood that a user is provided with an interface for input. At 404, the first layer of a codebase may be reviewed and the display may comprise a graphical generation showing several process. In the example of FIG. 5(a), processes A-YY are depicted. In FIG. 5(a), after the graphical generation of the Layer 1 at 404, the user augmented reverse engineering may next turn to Layer 2 at 406 and begin a graphical generation of this layer. Layer 2 may comprise any elements of a codebase and may be represented in any manner known in the art. With respect to FIG. 5(a), however, based on the number of initial process, and assuming that there are at least two or three elements in layer 2 at 406 for each process in layer 1 at 404, the graphical display is already becoming large and cumbersome.

FIG. 5(b) depicts a graphical representation after a user has provided input. In FIG. 5(b), a user selected process B of layer one at 408. Accordingly, the remainder of layer 1 at 404 and Layer 2 at 406 is excluded for the rest of the generation. Indeed, as depicted in FIG. 5 (b), selecting Process B at 408 may exclude all of Layer 3, or any other functions related to any of Process A, or Process C through Process YY. Thus, the complexity, time and confusion of the graphical generation may be greatly decreased by providing a user with a interface to interrupt a graphical generation and provide an input, and based on that input to exclude a portion of a codebase.

Figure 6:
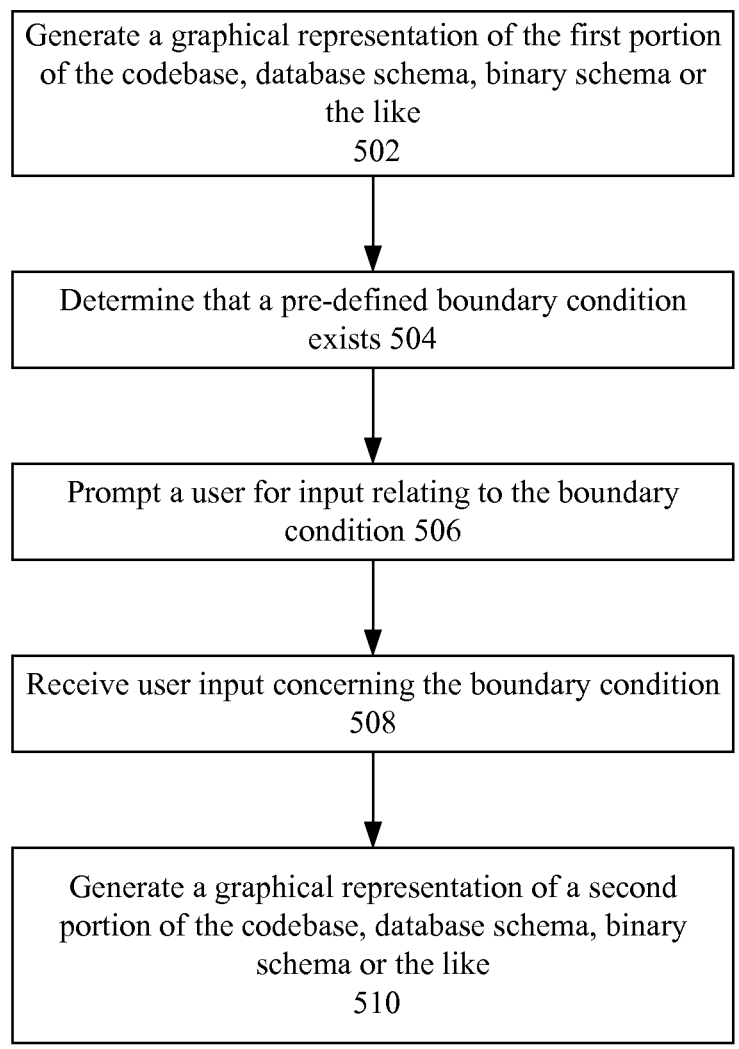

FIG. 6 depicts a flowchart of an example embodiment for responding to a boundary condition during user augmented reverse engineering. At step 502, user augmented reverse engineering may generate a graphical representation of a first portion of a codebase. Generating a first portion of a codebase 502 may include receiving user inputs to set they type of graphical representation, to set up or implement a user interface, to set or alter boundary conditions, to focus the generation and the like. The generation may also include reviewing the code, where the review is a static analysis or a run-time analysis, and creating graphical representations of the code that may be displayed on a display.

At step 504, user augmented reverse engineering may determine that a pre-defined boundary condition. Boundary conditions may be defined by a user or by a programmer, or they may occur within the code itself. In one embodiment, the boundary condition is related to memory or time. In another embodiment, the boundary condition is related to a plurality of probable solutions within the code itself, and/or boundary conditions may be related to the inability to obtain information from external sources such as databases, programs and the like. Other boundary conditions are possible and one having ordinary skill in the art will understand that the above are not limiting but merely provide a few examples of boundary conditions.

Step 504 calls out a boundary condition. It should be understood that in one embodiment, multiple boundary conditions are found to exist. User augmented reverse engineering may complete any portion of a generation of a graphical representation before addressing the boundary conditions. Thus, in one embodiment, user input may be less likely to be in error if a full static generation takes place before the user is prompted to provide solutions to boundary conditions.

At step 506, a user may be prompted to provide input related to the boundary conditions found to exist about at 504. A prompt to the user may be on a graphical display. The prompt may have a limited number of options that the user may select from, or it may be an open ended request for input. The prompt may also be limited to a type of input, such as numerical, alphabetic, string, of a certain length, or of any other type of input. One having skill in the art will realize that the above are not limiting on what a prompt may be, or what a user may be prompted for, but instead merely provide a series of example related to prompting.

At 508, the input from the user may be received. The user input may be provided in any manner known in the art, for example via a keyboard or mouse, a touch pad or screen, voice activation, a wired or wireless connection, or any other means. This input may be related to the boundary condition and may influence the graphical generation in one or more ways. For example, receiving a solution to a boundary condition may allow user augmented reverse engineering to build out a representation of new portion of a codebase, or it may focus a generation, or it may narrow the scope of a graphical representation.

At 510 of FIG. 6, the graphical generation may, in one embodiment resume. In another embodiment, it may restart with different parameters, or it may keep a portion of the previous generation and initiate a new generation on another portion of the codebase. The second portion may be a narrowed regenerated, undergo a more extensive generation, or focused in any manner. As noted above, there may be a single boundary condition satisfied, or multiple boundary conditions may be satisfied. Thus, the second portion of the generation may be related to the solution of a single boundary condition or it may be related to the solution of multiple boundary conditions.

Figure 7:
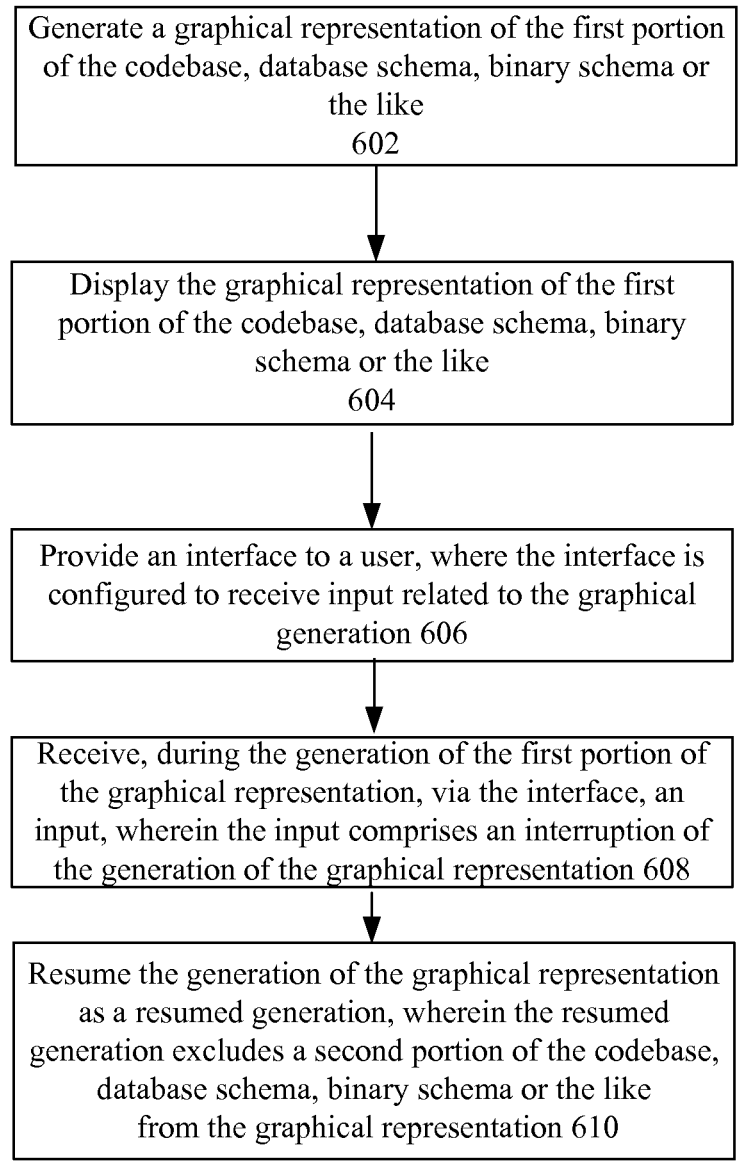

FIG. 7 depicts a flowchart of an example embodiment of user augmented reverse engineering for a user to provide input to influence a graphical generation. At step 602, user augmented reverse engineering may generate a graphical representation of a first portion of a codebase. Generating a first portion of a codebase 602 may include receiving user inputs to set they type of graphical representation, to set or alter boundary conditions, to set up or implement a user interface, to focus the generation and the like. The generation may also include reviewing the code, where the review is a static analysis or a run-time analysis, and creating graphical representations of the code that may be displayed on a display.

At step 604, user augmented reverse engineering may include displaying the graphical representation of the first portion of the codebase 604. The display may be any means or manner of displaying information to a user, such as a screen, projection, sound and the like. The display may be a real-time, or approximately real-time display, such that, as user augmented reverse engineering determines that one or more elements of a codebase should be included in a graphical generation, they are displayed. This may provide a user with information in a timely manner via a display at 604.

At step 606 of FIG. 7, a user may be provided with an interface, where the interface is configured to receive input related to the graphical generation. The interface may be capable of receiving input in any manner known in the art. For example a mouse click, keyboard entry, wired or wireless connection, touch pad or touch screen and the like may be configured for use with the interface. The interface may be associated with the state of the graphical generation as well. For example, as the generation adds elements, each element may become interactive or may otherwise be included in the interface such that a user may select or otherwise interact with elements of the generation. The interface 606 may comprise an input for solutions to, additions to, or subtractions from any element of a graphical generation. The inputs may influence the graphical generation in any manner known in the art, including focusing the generation, narrowing the generation, or expanding the scope of the generation.

At step 608, user augmented reverse engineering may receive, during the generation of the first portion of the graphical representation, via the interface, an input, wherein the input comprises an interruption of the generation of the graphical representation. Thus, during the generation of the graphical representation itself, the user may provide input and influence the generation in any manner. The input will interrupt the generation and allow for influence of the generation. The generation can be narrowed, changed, expanded, elements may be excluded or focused upon and the like. In one embodiment, the input does not alter the generation at all. The above serve as a few examples and do not limit the scope of the influence an input may have. Inputs may also alter boundary conditions and the like. One having skill will recognize other possibilities for the influence of inputs on the generation of the graphical representation.

At step 610, the generation of the graphical representation may resume after being interrupted. The resumed generation may exclude a portion of the codebase, thus decreasing the scope of the generation. This may be a focused or narrowed result.

Figure 8:
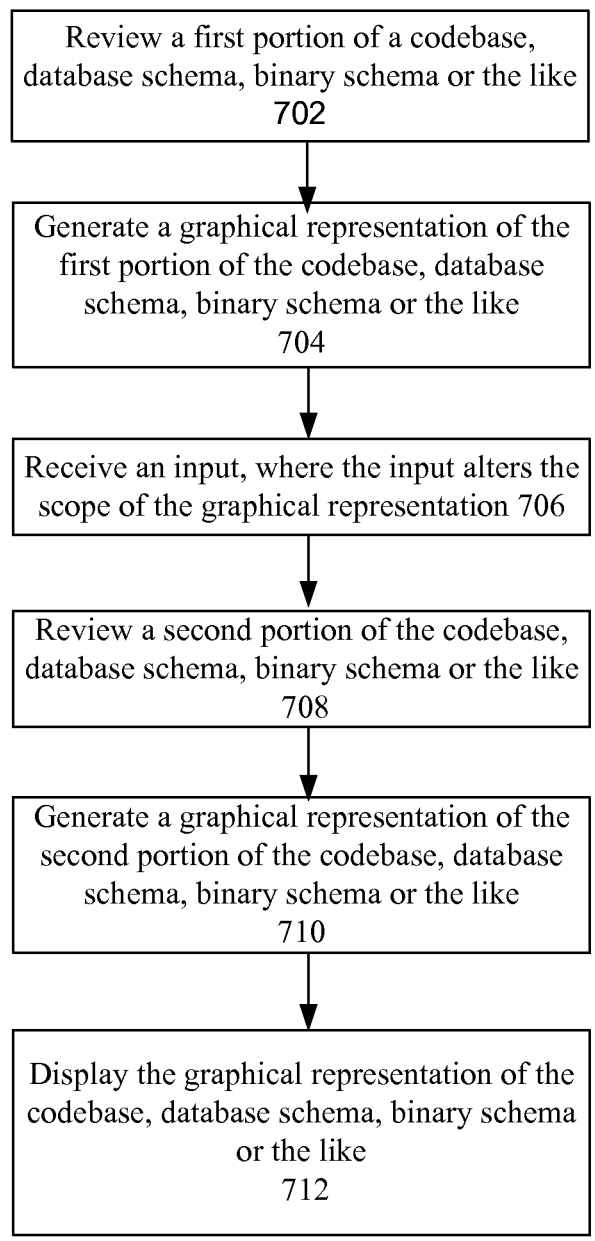
FIG. 8 depicts a flow chart representing one embodiment of a computer readable medium having instructions for user augmented reverse engineering.

FIG. 8 depicts a flowchart of an example embodiment of user augmented reverse engineering. At step 702, a first portion of a codebase is reviewed. The review may comprise determining the functionality or the timing, or any other aspect of elements of the codebase. During the review, graphical representations may be associated with the elements of the codebase that are reviewed.

At step 704, the graphical representation of the first portion of the codebase may be built. Generating a first portion of a codebase 702 may include receiving user inputs to set they type of graphical representation, to set or alter boundary conditions, to set up or implement a user interface, to focus the generation and the like. The generation may also include reviewing the code, where the review is a static analysis or a run-time analysis, and creating graphical representations of the code that may be displayed on a display.

At step 706, an input to user augmented reverse engineering may be received, where the input alters the scope of the graphical representation. The input may be, for example a mouse click, keyboard entry, wired or wireless connection, touch pad or touch screen and the like may be configured for use as an input. The input may comprise an interruption and may influence the scope of the generation in any manner known in the art. The generation can be narrowed, changed, expanded, elements may be excluded or focused upon and the like. In one embodiment, the input does not alter the generation at all. The above serve as a few examples and do not limit the scope of the influence an input may have. Inputs may also alter boundary conditions and the like. In one embodiment, the request for input is a response to a determination that there is a boundary condition. Thus, the input may be a solution to the boundary condition. One having skill will recognize other possibilities for the influence of inputs on the generation of the graphical representation.

At step 708, a second portion of the codebase may be reviewed. The review may comprise determining the functionality or the timing, or any other aspect of elements of the codebase. During the review, graphical representations may be associated with the elements of the codebase that are reviewed. The second portion of the codebase may be any portion of the codebase as influenced by the input. It may be a narrower portion, a new portion, the same portion, or any combination thereof. The second portion may be of the same type of graphical representation or it may differ in one or more ways. The second portion may be related to a boundary condition or a input during the generation itself. The second portion may then undergo a generation of a graphical representation at 710. This may include associating elements and preparing it for display at 712, where the display is any display known in the art as described above.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

What is claimed:

1. A computer-implemented, interactive method for creating a graphical representation of a codebase, comprising:
    generating, on a computing device, a graphical representation of a first portion of the codebase;
    determining while generating the graphical representation of the first portion, on the computing device, that one or more pre-defined boundary conditions exists within the first portion of the codebase wherein determining that the one or more pre-defined boundary condition exists comprises determining that there are insufficient computing resources to generate a graphical representation of the codebase, external data is needed for the codebase, or a representation of a second portion of the codebase has a plurality of possible solutions;
    prompting, by the computing device, a user for input relating to the one or more boundary conditions;
    receiving, by the computing device, user input concerning the one or more boundary conditions; and
    generating, on the computing device, a graphical representation of the second portion of said codebase limited by the one or more boundary conditions, wherein generating includes a static analysis or a run-time analysis of the second portion of said codebase, and creating graphical representations of the second portion of said codebase that is displayed on a display.

2. The method of claim 1, further comprising prompting the user with a plurality of options for each of the one or more boundary conditions, said plurality of options constraining the input.

3. The method of claim 2, further comprising selecting the plurality of options based on possible solutions to each of the one or more boundary conditions.

4. A computer-implemented, interactive method for creating a graphical representation of a codebase, comprising:
    generating the graphical representation of a first portion of the codebase;
    displaying the graphical representation of the first portion of the codebase;
    determining that a boundary condition exists by at least determining that there are insufficient computing resources to generate a graphical representation of the codebase, external data is needed for the codebase, or a representation of a second portion of the codebase has a plurality of possible solutions;
    providing an interface to a user, said interface configured to receive input related to the generation of the graphical representation of the first portion of the codebase;
    receiving an input via said interface during the generation of the first portion of the graphical representation, wherein the input comprises an interruption of the generation of the graphical representation based at least in part on the determination that the boundary condition exists; and
    resuming the generation of the graphical representation as a resumed generation based at least in part on a static analysis or run-time analysis of the second portion of the codebase, wherein the resumed generation excludes the second portion of the codebase from the graphical representation so that the graphical representation is displayed on a display device.

5. The method of claim 4, wherein the input further comprises a selection of a third portion of the codebase.

6. The method of claim 5, wherein the second portion of the codebase excluded from the resumed generate comprises portions of the codebase that are not included in said third portion of the codebase.

7. The method of claim 5, wherein the resumed generate of the graphical representation comprises a graphical representation of the third portion of the codebase.

8. The method of claim 4, further comprising providing an interface for receiving an input during the resumed generate of the graphical representation.

9. A computer readable storage device that is distinguished from transitory medium having stored thereon, instructions for executing on a processor said instructions comprising instructions for:
    reviewing a first portion of a codebase;
    generating a graphical representation of the first portion of the codebase;
    determining that a boundary condition exists by at least determining that there are insufficient computing resources to generate a graphical representation of the codebase, external data is needed for the codebase, or a representation of a second portion of the codebase has a plurality of possible solutions;
    receiving an input based on the graphical representation based at least in part on the boundary condition encountered in the first portion of the codebase, wherein said input alters the scope of the graphical representation;
    based upon receiving the input, reviewing the second portion of the codebase;
    generating a graphical representation of the second portion of the codebase based at least in part on a static analysis or a run-time analysis of the second portion of said codebase; and
    displaying the graphical representation of the codebase.

10. The computer readable storage device that is distinguished from transitory medium as recited in claim 9 having stored thereon instructions, the instructions further comprising:
    providing an interface for receiving instructions during the generation of the first portion of the graphical representation;
    receiving, via said interface, the input, wherein the instructions comprise an interruption of said generation of the graphical representation of the first portion; and
    resuming the generation of the graphical representation, wherein said resumed generation excludes a third portion of the codebase from the graphical representation.

11. The computer readable storage device that is distinguished from transitory medium as recited in claim 10 having stored thereon instructions, the instructions further comprising providing an interface for receiving a request during the resumed generation of the graphical representation.

12. The computer readable storage device that is distinguished from transitory medium as recited in claim 10 having stored thereon instructions, the instructions further comprising:
    providing an interface related to the boundary condition; and
    receiving, as a response from said interface, a solution to the boundary condition.

13. The computer readable storage device that is distinguished from transitory medium as recited in claim 12 having stored thereon instructions, wherein the interface comprises a plurality of options, said plurality of options constraining the response received from said interface.

14. The computer readable storage device that is distinguished from transitory medium as recited in claim 9 having stored thereon instructions, wherein determining that a boundary condition exists comprises determining that there is insufficient memory to generate a graphical representation of the codebase.

15. The computer readable storage device that is distinguished from transitory medium as recited in claim 9 having stored thereon instructions, wherein determining that a boundary condition exists comprises determining that data from a source external to the codebase is required to complete the generation of the graphical representation.

* * * * *